United States Patent [19]

Lachat et al.

[11] Patent Number: 4,812,805
[45] Date of Patent: Mar. 14, 1989

[54] SYSTEM FOR INTERCONNECTING PARKING METERS HAVING A MEMORY

[75] Inventors: Claude Lachat; Joële Ferrus, both of Besancon, France

[73] Assignee: Flonic, Montrouge, France

[21] Appl. No.: 881,450

[22] Filed: Jul. 2, 1986

[30] Foreign Application Priority Data

Jul. 2, 1985 [FR] France .................. 85 10058

[51] Int. Cl.$^4$ .......................................... G08C 19/06
[52] U.S. Cl. ..................... 340/825.05; 340/870.05; 340/825.35; 235/387; 368/111
[58] Field of Search ............... 340/51, 870.05, 825.34, 340/825.35, 825.05; 194/216, 217; 235/384, 470, 454; 364/467, 704, 707; 368/92, 108, 111; 346/14 MR

[56] References Cited

U.S. PATENT DOCUMENTS

| | | | |
|---|---|---|---|
| 3,760,160 | 9/1973 | Gieringer et al. | |
| 4,228,519 | 10/1980 | Pfeifer | 340/51 |
| 4,310,890 | 1/1982 | Trehn et al. | 340/51 |
| 4,356,903 | 11/1982 | Lemelson et al. | |
| 4,379,334 | 4/1983 | Feagins, Jr. et al. | |
| 4,495,617 | 1/1985 | Ampulski et al. | 340/825.05 |
| 4,561,092 | 12/1985 | Sharer | 340/825.05 |
| 4,576,273 | 3/1986 | Milnes | |
| 4,596,982 | 6/1986 | Bahr et al. | 340/825.05 |
| 4,622,550 | 11/1986 | O'Connor et al. | 340/825.05 |

FOREIGN PATENT DOCUMENTS

WO81/00778 3/1981 PCT Int'l Appl.
2148035A 5/1985 United Kingdom.

*Primary Examiner*—John W. Caldwell, Sr.
*Assistant Examiner*—Tyrone Queen
*Attorney, Agent, or Firm*—Sanford J. Asman

[57] ABSTRACT

The invention relates to a system for interconnecting memory slot machines, for example parking meters or ticket vending machines. Each slot machine ($B_1$, $B_2$, ...) includes a circuit ($C_1$, $C_2$, ...) which receives data to be transferred. These circuits are interconnected by a seizure loop (18; 20, 22) and by a data transmission loop (26, 28). When information becomes available at a slot machine, this causes the seizure circuit to be powered up, thereby supplying power to the data transfer loop and to the data-receiving circuits ($C_1$, $C_2$, ...) of the other slot machines. Once the information has been transmitted to the other slot machines, the above-mentioned circuits are no longer powered.

10 Claims, 4 Drawing Sheets

SYSTEM FOR INTERCONNECTING PARKING METERS HAVING A MEMORY

The present invention relates to a system for interconnecting slot machines having a memory, and in particular slot machines for receiving payment in respect of vehicle parking.

BACKGROUND OF THE INVENTION

By virtue of the considerable increase in vehicle ownership, in particular in large urban areas, the problem of vehicle parking is becoming more and more severe. In order to discourage drivers from leaving their vehicles parked for too long in the same place, the maximum duration for which parking is authorized is frequently reduced and sanctions are enforced for overstaying the time limit. In addition to reducing the maximum authorized parking duration, zones are spreading in which parking is not only regulated, but in which parking time must also be paid for, with the amount paid depending on the desired length of stay, up to a maximum permitted length.

In order to manage such payment for parking on the public highway, parking meters have been installed in sidewalks to receive payment for pairs of adjacent parking spaces. Drivers are required to insert money or money's worth into a slot in the parking meter corresponding to the desired period of parking. A mechanism including a clock movement is used to move a pointer whose position corresponds to the remaining permitted parking time. It is easy for people employed to check that parking is properly paid for to verify such parking meters; however, such meters suffer from the drawback that they can normally be positioned to control only one or two parking spaces. This means that a large number of such meters are required, and that collecting money from the meters becomes an expensive operation.

That is why proposals have been made for a new type of parking meter capable of collecting parking fees for a dozen or so parking spaces in the vicinity of the meter. Meters of this type are well known, at least in France. The driver parks on one of the parking spaces under the control of the meter and inserts coins into a slot in the meter to prepay a desired length of parking time. The meter includes a clock and electronic processing circuits for controlling, inter alia a printer device for printing out a parking slip. The important information on the slip comprises the date, the time at which paid-up parking expires, together with information relating to the location of the parking meter. The driver must place the parking slip behind the vehicle windshield so that the parking checker can check that parking is properly paid-for.

Checking the parking of vehicles under the control of such a parking meter requires rather more time than checking the parking of vehicles with individual clockwork pointers associated with each vehicle. This is because the checker firstly has to locate the parking slip, and having found the slip, the checker must check that the information printed on it is correct.

French patent application No. 85/08608 filed June 7, 1985 in the name of the present Assignee proposes to remedy this drawback by a new type of parking meter which simplifies the monitoring of parking. Each parking meter includes a keyboard at which a driver seeking to leave a car parked at one of the parking spaces controlled by the parking meter keys in the registration or "licence" number of the vehicle on the parking space. Electronic circuits in the parking meter include a memory for storing pairs of data items comprising a vehicle identification item and a parking time up item, with the time at which paid for parking expires being determined as a function of an amount of money inserted into the parking meter. The money may be inserted in the form of coins or in the form of a "card" such as a credit card or an electronic memory card, etc. When vehicles parked on parking spaces controlled by a given parking meter are to be checked, the checker merely has to interrogate the memory in the parking meter, by any suitable means, in order to discover whether the number on the number plate of a parked vehicle appears in the stored list of vehicle numbers whose paid for parking time has not expired. The checker may optionally inspect the parking time limit associated with the stored number. A solution of this type is simpler for the driver since there is no need to go back to the vehicle with the parking slip and ensure that it is visibly displayed. It is also simpler for the checker since information about authorized parking and parking time limits is to be obtained in a standardized manner at the parking meter.

On large roads or on large parking lots of the type commonly found close to commercial centers, it is necessary to provide a large number of such parking meters for the convenience of drivers. However, the convenience factor provided by having a large number of meters is somewhat limited since the driver must make use of the particular parking meter associated with the parking space actually used. In addition, if parking time is to be extended, the driver must return to the same parking meter in order to insert more money and the corresponding vehicle identity information. Similarly, a checker must begin the inspection of each individual parking zone by interrogating the corresponding parking meter, before actually looking at the number plates of the vehicles parked within the zone. This constitutes time wasted.

With conventional parking meters for controlling a zone of parking spaces, i.e. with meters which do not include a keyboard and which deliver a slip which must be visibly displayed for the purposes of checking that parking has been paid for, the meter comprises electronic circuits for determining the value of coins inserted, for calculating the time at which paid for parking expires, and for controlling the printer, etc. It often happens that these electronic processing circuits also include a memory for storing information such as the number of vehicles which come to park during the day, the total amount of parking fees paid, the average duration of paid for parking, etc. This information is periodically transferred from the parking meter memory to some other form of memory for use for statistical and other purposes. Since most parking areas have a plurality of independent parking meters on them, information must be transferred successively from the memory of each parking meter, thereby requiring each parking meter to be provided with means suitable for performing the transfer, for example: line transmission means, infrared transmission means, etc.

There are other situations in which a battery of slot machines are used to receive payment for the same or similar goods or services. For example, large railway stations are frequently equipped with slot machines which dispense tickets which are paid for using coins and which are selected as a function of destination, entitlement to half fare, class, etc. In addition to the electronic circuits necessary for processing the money inserted via the coin slot, the destination and tariff information as keyed in, and the ticket printer, such ticket dispensers may also include a memory for storing data corresponding to the transactions performed. This data is read periodically for several reasons, including monitoring the behavior of the ticket dispenser and obtaining travel statistics. Naturally, large railway stations require large numbers of such ticket dispensers.

Here again, it becomes necessary to interrogate each ticket dispenser individually in order to monitor proper operation thereof. This considerably increases the time taken to inspect each machine, and also complicates the structure of the machine since it must include means by which the data may be read from its memory.

Preferred implementations of the present invention provide a system of memory slot machines avoiding the above drawbacks. Parking meters and ticket dispensers are merely examples of the kind of slot machine to which the invention is applicable. The essential characteristics of such a machine are that it accepts money or money's worth in payment for goods or services and that it includes a memory for storing information concerning the transactions which it has performed.

SUMMARY OF THE INVENTION

The present invention provides a system of interconnecting memory slot machines, each slot machine including processor circuits and a memory for storing information, the system comprising:

connection means for connecting said slot machines to one another;

transmission means for transmitting the information stored in said slot machine memories over said connection means to at least one of said slot machines; and means for interrupting said transmission once the information contained in said memories has been transmitted.

It will readily be understood that at least one of the slot machines in the system can thus centralize all of the useful information collected by any of the slot machines. In addition, the connection only exists while there is information to be transmitted. Preferably, all of the memory slot machines in the system perform the same function and information collected by any one of them is transmitted and stored in all of the other slot machines as and when the information is received, or very soon thereafter.

Regardless of whether these slot machines are parking meters or ticket dispensers, they have a self-contained power supply such that the circuits under microprocessor control are only powered up when actually in use for processing a transaction. Longer term information is stored by circuits which have a back-up power supply that is uninterruptible.

In order to retain the advantage of such backed up memory circuits, it is preferable for the mode of connection and transmission to be such that it does not consume electrical energy during the transmission of information from one of the slot machines to the others.

To achieve this, the slot machines are inserted in a connection loop including seizure connection means and data transmission connection means, the seizure connection means including means for each slot machine which are sensitive to an operation being performed on a slot machine and which are suitable for seizing all of the machines in the loop, together with an electrical power supply for the data transmission link and for circuits in the other machines.

In a preferred implementation of the invention, the slot machines are parking meters.

BRIEF DESCRIPTION OF THE DRAWINGS

Embodiments of the invention are described by way of example with reference to the accompanying drawings, in which.

MORE DETAILED DESCRIPTION

Figure 2:
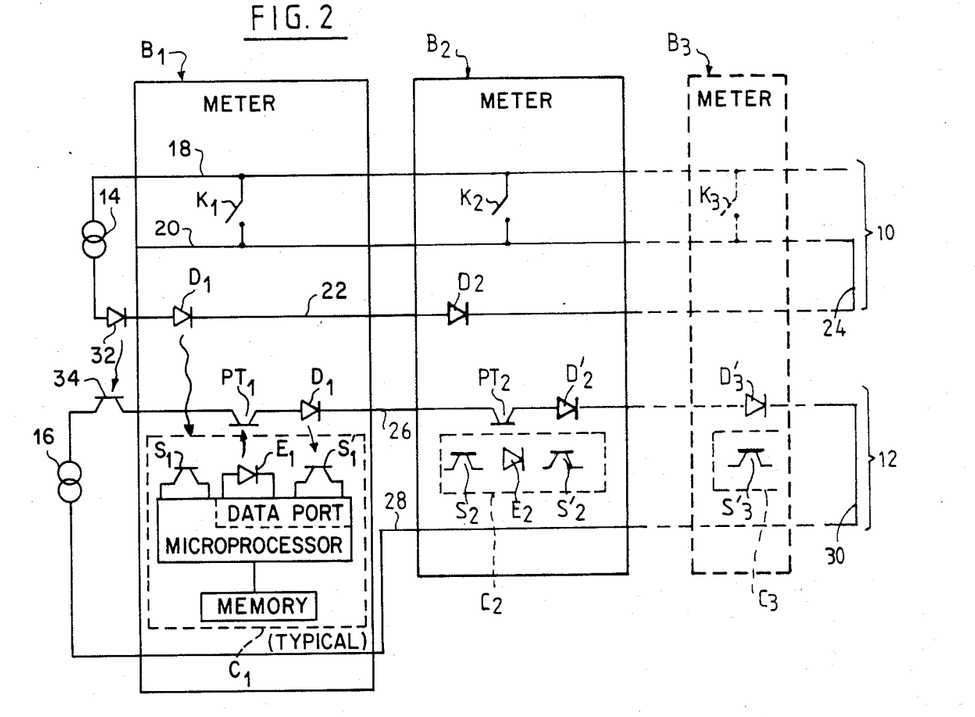
FIG. 2 is a simplified circuit diagram showing the "seizure" connection and the data transmission connection for a single connection loop in accordance with a first embodiment of the invention.

Reference is made initially to FIG. 2 while describing the basis of the connections for transferring information between various parking meters. In FIG. 2, these various meters are referenced $B_1$, $B_2$, $B_3$, etc. and the processing and memory circuits of these parking meters are referenced $C_1$, $C_2$, $C_3$ . . . etc.

The meters are interconnected by a seizure loop 10 and by a data transmission loop 12. The connection is powered by current sources 14 and 16 for the seizure loop 10 and the data transmission loop 12, respectively.

The seizure loop comprises three conductor wires 18, 20, and 22 which pass through each of the parking meters. The current source 14 is connected between the first ends of the wires 18 and 22, and the opposite ends of the wires 20 and 22 are short circuited at 24.

Each parking meter $B_1$, $B_2$, etc. includes a switch $K_1$, $K_2$, etc. connected between the wires 18 and 20, and also a light emitting diode (LED) $D_1$, $D_2$, . . . connected in series with the wire 22.

The data transmission loop 12 comprises two wires 26 and 28. The current source 16 is mounted between the first ends of the wires 26 and 28 and the opposite ends of these wires are short circuited at 30. A phototransistor $PT_1$, $PT_2$, . . . and an LED $D_1'$, $D_2'$, . . . are connected in series in the wire 26 at each of the parking meters. In addition, the wire 22 of the seizure loop and the wire 26 of the data transmission loop respectively have an LED 32 and a phototransistor 34 mounted in series therein and optically coupled together.

Finally, each processing circuit $C_1$, $C_2$, . . . includes first and second phototransistors $S_1$, $S'_1$, $S_2$, and $S'_2$, . . . for co-operating with the corresponding diodes $D_1$, and $D'_1$, and $D_2$ and $D'_2$, etc., and an LED $E_1$, $E_2$, . . . for co-operating with the corresponding phototransistor $PT_1$, $PT_2$, . . . .

This connection operates as follows. So long as a driver is not making use of a parking meter, its switch $K_1$, $K_2$, . . . is open. The seizure loop 10 is thus also open as is the data transmission loop 12.

When a data item is inserted into the processing circuit of one of the parking meters, for example into the circuit $C_2$ in parking meter $B_2$, the corresponding switch $K_2$ closes, thereby also closing the seizure loop 10.

The current generator 14 then causes current to flow round this loop, e.g. 20 mA. This activates the LEDs 32, D1, D2, etc. The light emitted by the LED 32 is received by the phototransistor 34 thereby closing the data transmission loop 12 and allowing the current source 16 to cause a current to flow therealong, thereby powering the LEDs $D'_1$, $D'_2$, ... and the phototransistors $PT_1$, $PT_2$, ... Simultaneously, the light emitted by the LED $D_1$ is received by the phototransistor $S_1$ in circuit $C_1$ (and similarly the light emitted by the LED $D_2$ is received by $S_2$ in $C_2$, etc.) thereby powering the corresponding circuit $C_1$ and in particular its LED $E_1$ and its phototransistor $S'_1$ (and likewise powering the circuit $C_2$ and its LED $E_2$ and phototransistor $S'_2$, etc.).

It can be seen that in this situation the data transmission loop 12 and the circuits $C_1$, $C_2$, in parking meter $B_1$, $B_2$, etc. are powered, thereby allowing data to be effectively transmitted. In the example shown, data is assumed to have been inserted into the circuit $C_2$ of parking meter $B_2$, and this data is applied to the wire 26 in accordance with a procedure which is described below via the optical coupler constituted by LED $E_2$ and phototransistor $PT_2$. This information is then applied to all of the other circuits $C_1$, $C_3$, etc. in all the other parking meters $B_1$, $B_3$, etc. by the electro-optical couplers constituted by component pairs $D'_1$ & $S'_1$, $D'_3$ & $S'_3$, etc. When transmission is over, switch $K_2$ is re-opened, thereby opening the seizure loop 10 and the data transmission loop 12. Current is no longer taken from the current generators 14 and 16.

Figure 1:
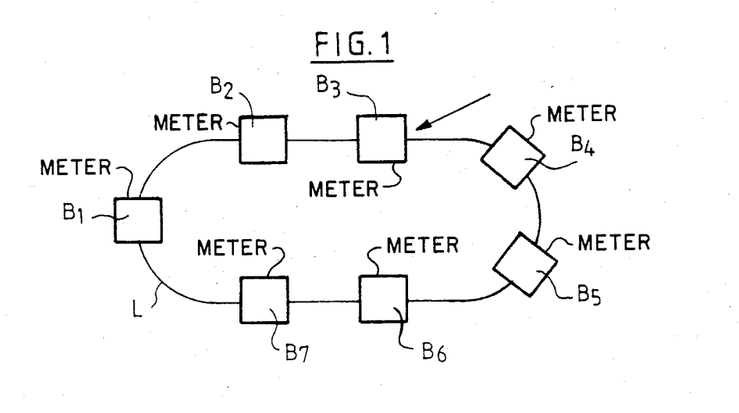
FIG. 1 is a block diagram showing a set of parking meter slot machines constituting a single interconnection loop.

Reference is now made to FIG. 1 for describing in greater detail the procedure whereby information is transmitted between the parking meters. This figure shows seven parking meters $B_1$, $B_2$, ... $B_7$ mounted in a single loop which is shown in the form of a single line L (which represents all five wires of the loop, which comprises a seizure loop and a data transmission loop having the structure described with reference to FIG. 2). In the following description it is assumed that data has just been inserted at parking meter $B_3$ which is highlighted in FIG. 1 by an arrow, and that this data is to be transmitted to the other parking meters.

Begin by assuming that no data transmission is taking place, i.e. that both the seizure and data transmission loops are unpowered. The insertion of data into parking meter $B_3$ causes it to close its switch $K_3$. This means that a driver is using parking meter $B_3$ and is inserting information thereto, either by means of its keyboard or by inserting a suitable data-bearing card. This causes power to be applied to the circuits of parking meter $B_3$ and these circuits cause switch $K_3$ to close in order to allow the parking meter to be used by the driver. As a result, the entire loop is powered together with the circuits in the other parking meters, in the manner described above with reference to FIG. 2.

Before any communication can take place, a waiting period must elapse in order to leave time for the microprocessors which constitute the main components of the circuits $C_i$ of the parking meters to power up and operate properly. Thereafter, the information transmission procedure takes place in the following manner using a sequential protocol.

The parking meters are authorized to transmit in a pre-established order, for example $B_1$, $B_2$, ... $B_7$.

If the parking meter $B_1$ has nothing to transmit it forward its authorization to $B_2$ together with its own operating state, and so on. This cycle continues until it reaches the meter $B_3$ which activated the seizure loop.

Meter $B_3$ then transmits its information over the data transmission loop by means of the above-described opto-coupler assemblies. This information is received successively by the meters $B_4$, ... $B_7$, $B_1$, and $B_2$, each of which delivers a message-received signal after reception. If a message-received signal is not returned, two further attempts are made at transmitting the information. After receiving the message-received messages, the circuit $C_3$ causes the switch $K_3$ in the meter $B_3$ to open. If none of the other switches $K_i$ has been closed during the above cycle, the seizure loop is no longer powered. However, if some other meter has begun to receive information for transmission during an earlier transmission cycle, the switch $K_i$ of the corresponding meter $B_i$ is closed and the interrogation cycle continues until it reaches the meter with information for transmission, thereby starting another information transmission cycle.

If some other meter was already transmitting information to the other meters in the loop when the meter $B_3$ closed it switch $K_3$, this situation is detected by the circuit $C_3$ since the seizure and the data transmission loops are already powered when it causes the switch $K_3$ to close. The meter $B_3$ therefore does not transmit its own data until it has sent all the message-received messages that may be required by the other meters.

Figure 3:
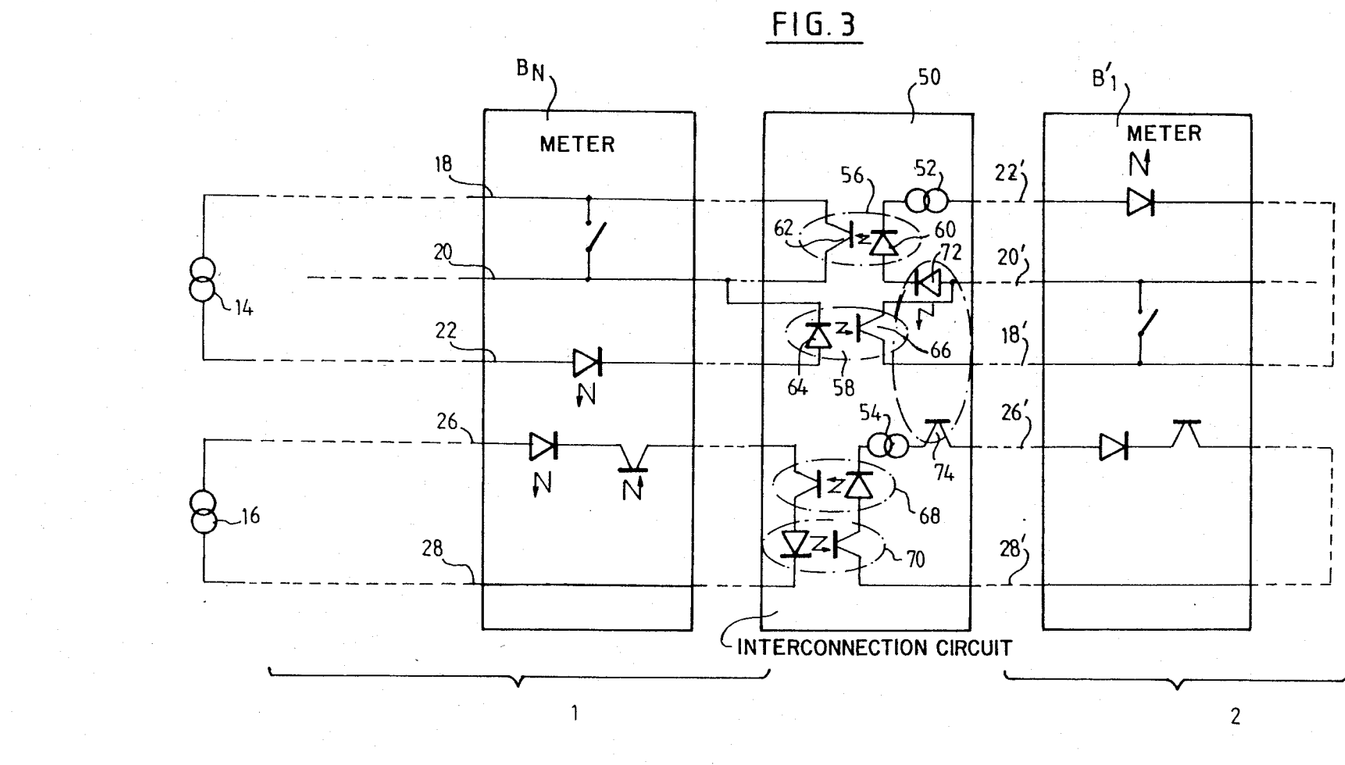
FIG. 3 is a diagram similar to FIG. 2 showing an interconnection between two connection loops.

The above description supposes that the parking meters $B_i$ are all connected to a single loop. However, current loops are of limited range due to the nature of the cables used, to the transmission speeds used, to the current generators used, etc. Consequently, it may be advantageous to provide a plurality of transmission loops which are interconnected in order to transmit information between parking meters which are connected in different, but interconnected loops. FIG. 3 is a circuit diagram for interconnecting two loops. In FIG. 3, $B_N$ represents the last parking meter of a first loop and $B'_1$ represents the first parking meter of a second loop. The first loop has the first wires 18, 20, and 22 in its seizure circuit and the same wires 26 and 28 in its data transmission circuit as described above. The second loop has corresponding wires 18', 20', 22', and 26', 28'. The circuit for interconnecting the two loops is referenced 50.

The interconnection circuit 50 comprises two current generators 52 and 54 which perform the same functions for the second loop as do the current generators 14 and 16 for the first loop. The current generator 52 for the seizure circuit is mounted on one end of the wire 22', and the current generator 54 for the data transmission circuit is mounted on one end of the wire 26'. The seizure circuits of the two loops are interconnected by means of two opto-electronic couplers 56 and 58. The coupler 56 is constituted by an LED 60 connected between the current generator 52 and the wire 20' and by phototransistor 62 connected between the lines 18 and 20. Similarly the coupler 58 is constituted by an LED 64 connected between the wires 20 and 22, and by a phototransistor 66 connected between the wires 18' and 20'.

The two data transmission circuits are interconnected by means of two opto-electronic couplers 68 and 70 mounted head to tail between the ends of wires 26 and 28 and 26' and 28'. Finally, another optoelectronic coupler constituted by LED 72 and by phototransistor 74, similar to the FIG. 2 coupler constituted by components 32 and 34, serves to close the data transmission circuit (26', 28') of the second loop when the seizure circuit of that loop is powered.

The operation of the coupling circuit 50 is an obvious extension of the above description.

If a switch $K_i$ of the first loop is closed, the current flowing in the seizure circuit of the first loop activates the coupler 58 which allows current to flow round the seizure circuit of the second loop. The coupler 56 provides the inverse function in the event that a switch $K'_i$ of the second loop is closed. Similarly, the two data transmission circuits are interconnected to transmit data in both directions by means of the two opto-couplers 68 and 70.

Further loops may be connected by means of interconnection circuits 50 identical to that shown in FIG. 3, with each loop having its own pair of current generators, one for the seizure circuit and one for the data transmission circuit.

Figure 4:
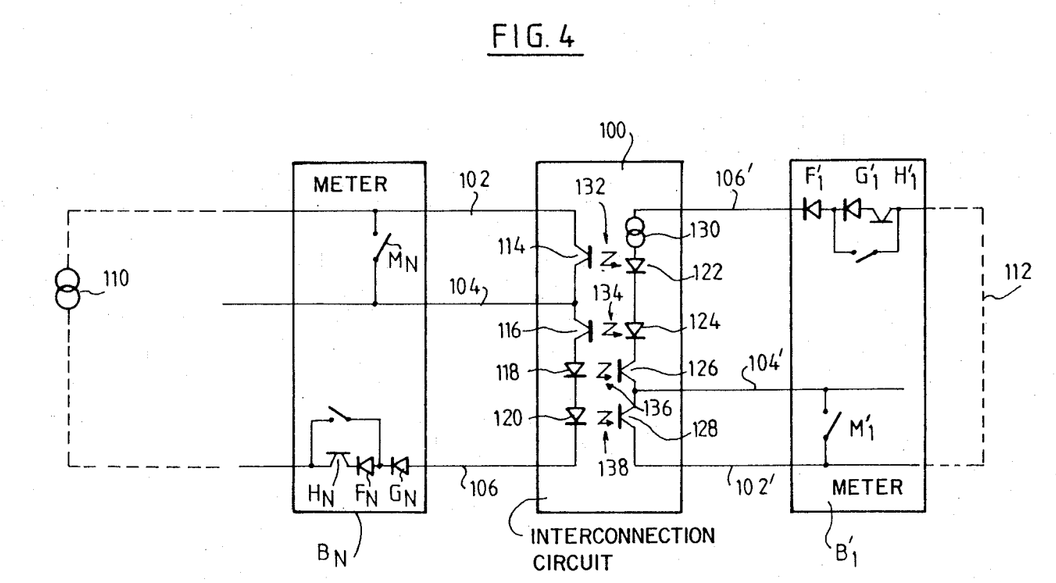
FIG. 4 is a diagram similar to FIG. 2, but showing a variant embodiment.

FIG. 4 shows a variant embodiment of a connection loop between two parking meters together with an interconnection between two such connection loops.

In the circuit described with reference to FIGS. 2 and 3, the connection between two parking meters requires five electrical conductors. FIG. 4 shows a variant circuit which needs only three conductor wires to provide the connection, with the seizure and data transmission circuits making use of the same wires.

FIG. 4 shows the last parking meter $B_N$ of the first connection loop, the first parking meter $B'_1$ of the second connection loop, and the circuit 100 for interconnecting the two loops.

The first loop is constituted by wires 102, 104, and 106, while the second loop is constituted by wires 102', 104', and 106'. Parking meter $B_N$ has a switch $M_N$ connected between wires 102 and 104, LEDs $F_N$, and $G_N$, and a phototransistor $H_N$ all connected in series on the line 106.

Similarly, the parking meter $B'_1$ has a switch $M'_1$ connected between the conductors 102' and 104', and it has LEDs $F'_1$ and $G'_1$ together with a phototransistor $H'_1$ connected in series with the line 106'. The first ends of wires 102 and 106 of the first loop are connected to the terminals of a current generator 110, and the second ends of the wires 102' and 106' are short circuited at 112.

The interconnection circuit 100 between the two loops comprises a phototransistor 114 connected between the second ends of the wires 102 and 104 and a phototransistor 116 together with two LEDs 118 and 120 connected in series between the second ends of wires 104 and 106 of the first loop. The circuit 100 also comprises a phototransistor 128 connected between the first ends of wires 102' and 104' of the second loop and LEDs 124 and 122 together with phototransistor 126 connected between wires 104' and 106'. Finally, it includes a current generator 130 connected in series with wire 106'.

The opto-electronic components 114 to 128 are associated in pairs to form four optical couplers 132, 134, 136, and 138 which are respectively constituted by the following component pairs: 114 & 122; 116 & 124; 118 & 126; and 120 & 128.

The circuit shown in FIG. 4 operates as follows:

When none of the switches $M_i$ or $M'_i$ in the first and second loops is closed, no current flows around these loops and none of the processor circuits of the parking meters (not shown in FIG. 4) is powered. If one of the parking meters has data for transmission to the other meters, the switch $M_i$ or $M'_i$ associated therewith is closed. Assume that the switch $M_N$ of the first loop is closed. Closing this switch causes current to flow around the first loop. This current flow activates LEDs $F_i$, thereby causing power to be applied to the circuits in parking meters $B_1$ to $B_N$. Similarly, this current flow activates coupler 138, thereby turning on the second loop. When the second loop is turned on, LEDs $F'_i$ in meters $B'_i$ are activated, thereby causing power to be applied to the circuit in the meters $B'_i$. In this situation both loops and all of the processing circuits in the parking meters of both loops are powered and information can be transferred between the meters $B'_i$ and $B_i$ using the procedure described above with reference to FIG. 1.

If a meter in the second loop has information for transmission, for example if the meter $B'_1$ has information to transmit, a symmetrical process to that described above takes place. The closure of switch $M'_1$ causes current to flow in the second loop.

This current flow causes power to be applied to the circuits in the other meters on the second loop by means of the LEDs $F'_i$ and it also switches on the first loop by means of the optical coupler 132. When the first loop is switched on, power is also applied to the processor circuits of the parking meters $B_i$ in the first loop.

It must be specified that in the second embodiment shown in FIG. 4, it is necessary for the processing circuits in the parking meters to be capable of distinguishing between genuine data signals and transient signals, and also between data signals and the end of a connection in the connection loops, since the seizure circuits and the data transmission circuits are superposed.

In the above description, coupling between the loops and coupling between the loops and the circuits is provided by optical couplers. Equivalent coupling could equally well be provided by magnetic couplers, by electromagnetic couplers, by capacitive couplers, by inductive couplers, etc.

When the parking meters do not include keyboards, the purpose of transferring information is to centralize all of the available information in a single terminal for statistical purposes. This may take place in two different ways: either all of the available information is collected in the memory of each parking meter, or else a special parking meter is designated for collecting the information.

When all of the information is collected in all of the parking meters, operation is exactly as described above with reference to FIGS. 1 to 4. Each time a driver inserts coins in a parking meter a data transfer cycle is set off. When the parking meter issues a parking slip, it also closes its switch $K_i$ thereby initiating a cycle.

When information is collected in a specialized parking meter, operation is slightly different. Only the special meter which is to collect all of the information includes a switch $K_i$. When information is to be collected, a special member is actuated to cause the parking meter to close its switch $K_i$ and thereby power the data transfer circuit and the data processing circuits of the other parking meters. The main or special parking meter interrogates each of the other meters in succession and these reply, again in succession, by transmitting the information contained in their memories so that it is stored in the memory of the main parking meter.

A parking checker then only needs to read the memory of the main meter, by any suitable means, in order to obtain the information stored therein.

The same type of interconnection circuit is suitable for interconnecting slot machines which perform other functions. For example it is suitable for interconnecting ticket dispensing machines at railway stations. Each machine includes a memory which stores data concerning the tickets is has dispensed. One of the ticket dispensers is a main dispenser and can be used to interrogate the other dispensers. The main dispenser includes a memory with sufficient capacity for storing, at least temporarily, all of the data stored in all of the dispensers connected to the main dispenser.

Figure 5:
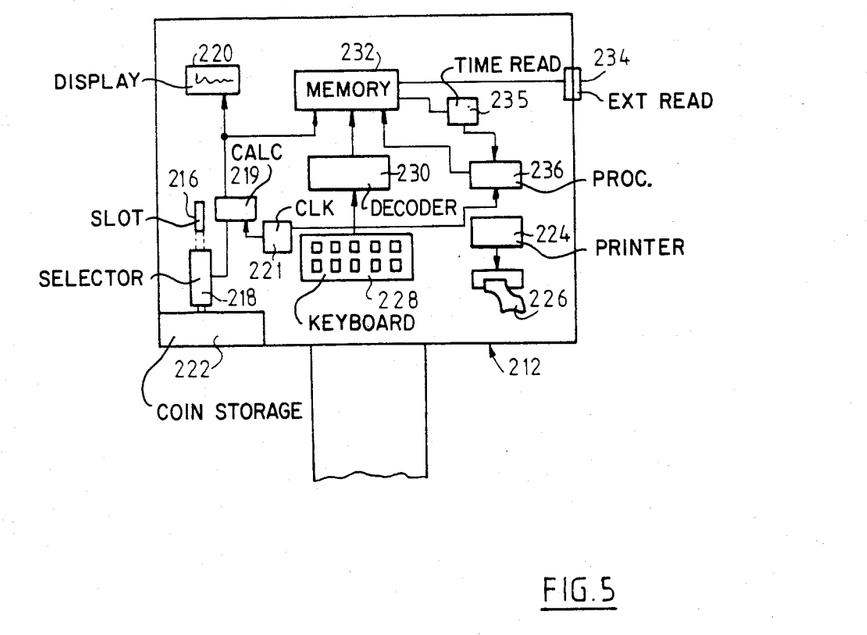
FIG. 5 is a view of a parking meter suitable for inclusion in a connection loop.

Reference is now made to FIG. 5, which shows a parking meter which is adapted to be mounted in an interconnection system according to the present invention.

Each parking meter 212 is placed on the sidewalk in order to control a plurality of parking spaces disposed along said sidewalk.

In conventional manner, the meter 212 includes a slot 216 through which coins are inserted to make up a total amount of money which determines the parking time paid for. The coins inserted into the slot 216 are checked by a coin selector 218 which determines the amount actually inserted through the slot 216. A calculator 219 determines the time at which paid up parking expires on the basis of said total amount of money inserted through the slot 216 and the present time as delivered by a clock circuit 221. The end of parking time is displayed on a display panel 220. Naturally, after passing through the coin selector 218, the coins are stored in a receptacle 222. The meter 212 also includes, in conventional manner, printer means 224, e.g. of the thermal head type, suitable for dispensing a printed slip 226 to the driver, with the slip indicating the amount paid and the time at which parking expires. However, it must be emphasized that in accordance with the invention, the slip 226 serves merely as a receipt for the payment made by the driver, although it may also serve to remind the driver of the parking time limit. The slip 226 is not used in any way for actually checking whether vehicles are in violation, as appears from the following description.

The meter 212 further includes a keyboard 228 enabling the driver, prior to inserting money into the slot 216, to key data into the meter suitable for identifying the parked vehicle.

This identification data may be constituted by the full registration (or license) number of the vehicle or merely by a portion thereof, or else by a number identifying the parking space where the vehicle has been left, in which case each parking space must be marked out and labelled with a number.

The data inserted via the keyboard 228 is decoded by a decoder 230 and stored in a memory circuit 232. The memory circuit 232 also serves to store the parking time limit for said vehicle (as taken from the calculator 219) in conjunction with the vehicle identity data. Thus, the memory 232 stores data items in pairs, with each pair being constituted by vehicle identity data and by a time limit on authorized parking. The parking meter also includes external means referenced 234 to enable the data stored in the memory 232 to be read from outside the meter.

Finally, the parking meter includes a circuit 235 for reading time data contained in the memory 232. This data is read periodically and a circuit 236 compares the time data as read with the present time data as delivered by the clock 221. If the present time is later than the time data read in the memory (by more than a predetermined period of grace, e.g. three minutes), then the circuit 236 deletes the time data as read from the memory 232 together with the vehicle identity data. It will thus be understood that the pairs of data items stored in the memory 232 correspond to properly parked vehicles to within the accuracy of the frequency with which the memory is read (and taking account of the period of grace).

When parking meters of the type described in relation to FIG. 5 are interconnected according to the present invention, the data stored in memory 232 of one parking meter are to be transmitted to the other parking meters and stored in their memory 232. Particularly the content of the memory 232 is changed each time a user inserts coins into the slot of the parking meter. This operation corresponds to the beginning of a parking period, and performs the seizure of the interconnecting loop. For example the signal which controls the printing means 224 also produces the closing of the switch $K_i$ of the parking meter. The memory 232 includes a specified area wherein the new data to be transmitted to the other parking meters are temporarily stored. The signal which controls the seizure of the data transmission loop, also controls the reading of the data which are stored in the specified area of the memory 232 and which are to be transmitted to the other parking meters. The reading circuit transmits the data read in the memory to the emitting diode $E_i$ of the parking meter.

The other parking meters of the interconnecting loop will receive these data according to the following steps: The seizure signal causes the supply of electric power to the electronic circuits of the parking meter and, particularly to the writing circuit associated to the memory 232 of the parking meter. The data to be memorized are received by the photo-transistor $S'_i$ of the parking meter. These data are then transmitted to the writing circuit which causes the recording of the data into the memory 232.

In fact, the content of the memory 232 is also changed when the comparison circuit 236 detects that the authorized parking time limit has expired. Because each parking meter includes its own comparison circuit which is periodically enabled, the deletion of the data is performed simultaneously in the memory 232 of each parking meter.

As already mentioned, other types of electronic memory parking meters could be interconnected by means of the system according to the present invention. Particularly, the payment of the parking fees can be performed by using electronic or magnetic memory cards. In such a case, a card reader is substituted to the coin selector 218. The parking time duration is introduced into the parking meter circuits, for example, by means of the keyboard 228.

It follows from the above description that regardless of the interconnection mode of the slot machines, information is transmitted between the various machines without requiring the connections between the machines to be permanently powered and without requiring the microprocessor circuits in the slot machines to be permanently powered, either.

We claim:
1. A system of interconnecting a plurality of machines together for information transmission, each machine including a processor circuit and a memory for storing information, the system comprising:
   connection means for connecting said machines to one another, said connection means including seizure circuit means responsive to an operating condition of said machines for causing said processor circuit and said memory in other machines in said system to be activated;

transmission means for transmitting information stored in the memory of at least a first of said machines over said connection means to at least one other of said machines for storage in a memory of at least one other of said machines, said transmission means including means at each machine for transmitting said information substantially upon its appearance at each machine, said information being transmitted to all of the other machines; and means for interrupting transmission by said transmission means once said information from at least said first of said machines has been transmitted.

2. A system according to claim 1, wherein the transfer circuit is coupled to said seizure circuit by opto-electronic means, and wherein said processor circuit and said memory in said machines are coupled to said seizure circuit by opto-electronic means.

3. A system according to claim 2, wherein said connection means comprise a plurality of electrical interconnection loops having a plurality of machines connected thereto, with each loop including a seizure circuit and a data transfer circuit powered by a current source, with the seizure and data transfer circuits of each loop being optically interconnected with the seizure and data transfer circuits respectively of another loop.

4. An interconnection system according to claim 1, wherein each machine is a parking meter including means for receiving money corresponding to a duration of paid-for parking, and means for calculating the time at which the parking paid for by said money will expire, said time being stored in said memory.

5. A system of interconnecting a plurality of machines, each machine including a processor circuit and a memory for storing information, the system comprising:

means for electrically coupling said machines to one another in at least one serial loop;

means for powering said electrical coupling means, said powering means being normally deactivated except upon the application of an activation signal generated by a machine;

means located at each machine for generating said activation signal in response to an operating condition of the machine;

transmitting means for coupling information contained in the memory of a machine so activated to said loop;

means located at each machine for receiving the information from said transmitting means and for storing the information from said transmitting means in the memory associated with each machine; and means located at each machine for terminating the activation signal generated by its associated machine upon the completion of transmission of information from said transmitting means of the machine, whereby power is removed from said electrical coupling means.

6. A system of parking meters comprising:

a plurality of parking meters, each parking meter being able to control a plurality of parking spaces, each parking meter including means for receiving money corresponding to a duration of paid for parking, clock means for delivering present time information, means for calculating the time at which the parking paid for by said money will expire, and memory means for storing said time information;

connection means for connecting said parking meters to one another;

transmission means for transmitting said time information stored in the memory means of at least a first of said parking meters over said connection means to at least one other of said parking meters for storage in at least the memory means of said one other parking meter; and means for interrupting said transmission once the time information from at least the first parking meter has been transmitted.

7. A system according to claim 6, wherein said transmission means includes means at each parking meter for transmitting said time information substantially upon its appearance at one of said parking meters to all of the other parking meters.

8. A system according to claim 6, wherein said connection means includes seizure circuit means responsive to an operating condition of said machines for causing the processor circuit and memory in the other machines to be activated, and transfer circuit means for causing said activation to be interrupted after said information has been transferred.

9. A system according to claim 8, wherein the transfer circuit is coupled to said seizure circuit by opto-electronic means, and wherein said processor circuit and memory in said machines are coupled to said seizure circuit by opto-electronic means.

10. A system according to claim 9, wherein said connection means comprise a plurality of electrical interconnection loops having a plurality of machines connected thereto, with each loop having a seizure circuit and a data transfer circuit powered by a current source, with the seizure and data transfer circuits of each loop being optically interconnected with the seizure and data transfer circuits respectively of another loop.

* * * * *